May 15, 1923.
R. BLAKOE
1,455,704
FRICTION DRIVING GEAR FOR MOTOR VEHICLES, MOTOR BOATS, AND AIRCRAFT
Filed July 17, 1919     2 Sheets-Sheet 1
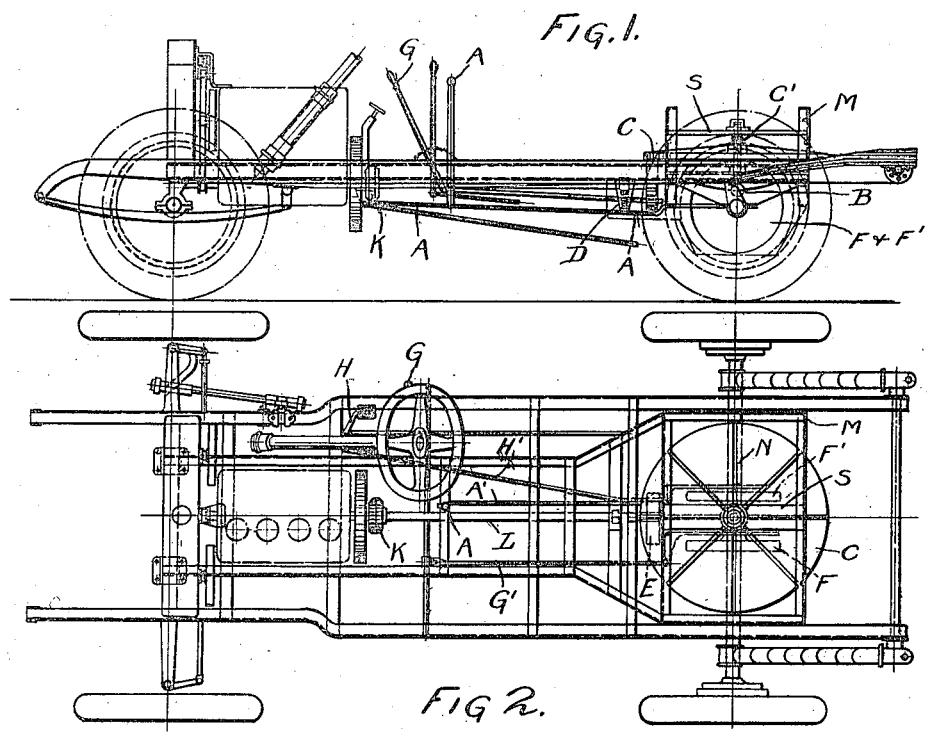

May 15, 1923. 1,455,704
R. BLAKOE
FRICTION DRIVING GEAR FOR MOTOR VEHICLES, MOTOR BOATS, AND AIRCRAFT
Filed July 17, 1919  2 Sheets-Sheet 2
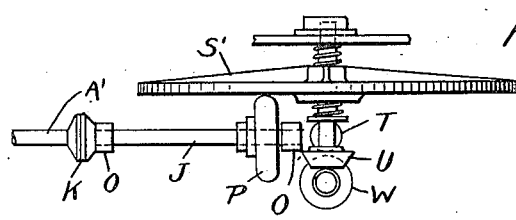
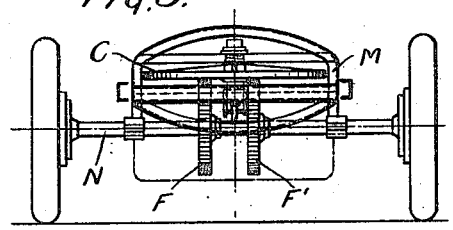
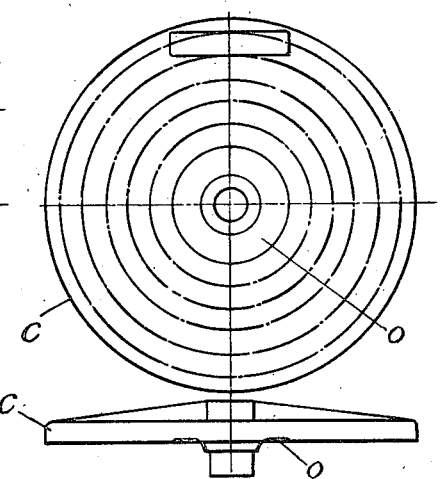
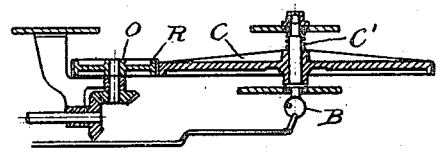
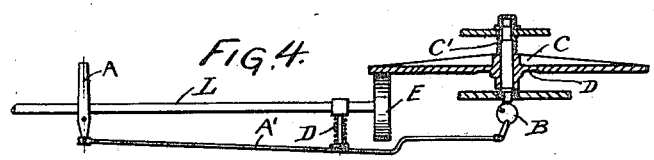
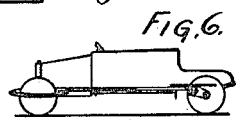
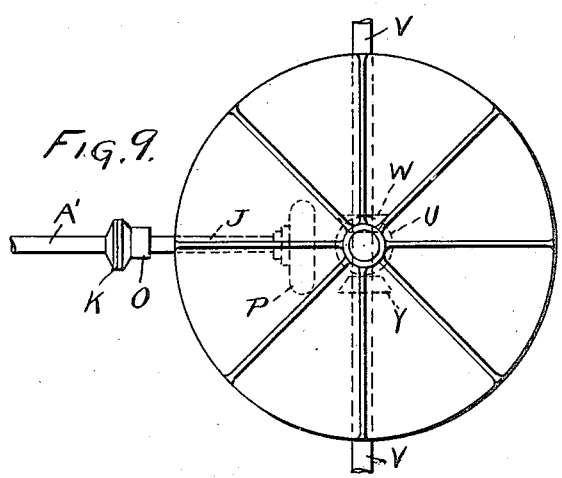
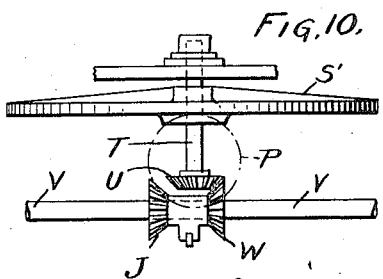

Patented May 15, 1923.

1,455,704

UNITED STATES PATENT OFFICE.

ROBERT BLAKOE, OF LONDON, ENGLAND.

FRICTION DRIVING GEAR FOR MOTOR VEHICLES, MOTOR BOATS, AND AIRCRAFT.

Application filed July 17, 1919. Serial No. 311,597.

*To all whom it may concern:*

Be it known that I, ROBERT BLAKOE, of 46 Bryanston Street, Marble Arch, London, W. 1, England, have invented certain new and useful Improvements in Friction Driving Gears for Motor Vehicles, Motor Boats, and Aircraft, of which the following is a specification.

My invention relates to improvements in friction driving gear for motor vehicles, motor boats and aircraft, with driven discs, and provides a greater number or range of speeds than any type of friction or gear driven car, motor boat, or aircraft, previously in use, the reason for this being, the new position for driven disc wheels, which are located above the rear axle in a horizontal plane, can be of much larger size than any driven disc in a vertical position, the horizontal disc indeed may extend to nearly the full distance between rear road wheels.

According to my invention, I suitably mount my large driven disc on a ball-bearing bracket on a frame over the axle, or on a girder frame resting on ends of axle. On this splined axle itself, I mount two friction wheels, one of which is driven by the large driven disc being in contact with it and the numerous speeds being obtained by the axle friction wheel travelling from centre to outside edge of the driven disc, or vice versa. A deep track is cut on under surface of driven disc, the object being that, when driving forward, the other friction wheel which provides a reverse travel of car, will be put into its deep track and so out of contact with driven disc, likewise when travelling backwards the forward drive wheel is put in its track. Both of these axle friction wheels are moved by fork or other suitable method, along splined axle.

The driven disc receives its movement direct from the engine fly wheel shaft which drives horizontal shaft through a universal joint. At the rear end of said horizontal shaft is mounted a driving disc which comes into forced contact with under surface of said driven disc and its only object is to rotate the driven disc, the axle friction wheels on the under side giving all speeds according as they are moved on a splined axle to or from centre of driven horizontal disc.

Pressure of the driven disc on the driving disc is obtained by a powerful spring and the pressure contact instantly removed by a simple movement of a cam which lifts the driven disc. The driven disc provides all speeds forward as well as reverse.

The disc on one end of the shaft may drive the horizontal disc on its upper surface or on its outside edge.

In order that my invention may be properly understood and readily carried into effect, I have hereunto appended three sheets of drawings, of which—

Figure 1 is a front elevation of the chassis of a motor car fitted with the friction drive.

Figure 2 is a plan.

Figure 3 is an end elevation of the same.

Figure 4 is a view drawn to an enlarged scale, illustrating a method of disengaging the discs from contact.

Figure 5 is an enlarged view of the horizontal driven disc.

Figure 6 is a view showing the application of the friction drive to a high speed car.

Figure 7 is a view showing an alternative method where the horizontal driven disc is driven by means of a pinion wheel engaging with teeth cut round the periphery of the disc.

Figure 8 is an elevation of a modification of my invention.

Figure 9 is a plan.

Figure 10 is an end elevation.

Referring to the drawings, the large driven disc C is mounted on a ball-bearing bracket on a frame S over the axle N. Two friction wheels F, $F^1$ are mounted on the splined axle itself, the one F (by travelling on the splined axle N) is driven by the large driven disc C and it is in contact with it. The various speeds are obtained through the axle friction wheel F travelling from centre to outside edge of the driven disc C, or vice versa. On the outside under surface of the driven disc there is a deep track O so that, when driving forward by friction wheel F the other friction wheel $F^1$, which provides a reverse travel of car, will be put into the deep track and so out of contact with the driven disc C, and when travelling backwards the forward friction or drive wheel F is put into the track. Both of the friction wheels F, $F^1$, may be moved by a fork or other suitable means. As shown in the drawings, the wheel F is moved by the speed control lever G and rod $G^1$ and the axle driving wheel or disc $F^1$ by the reverse lever H and the reverse rod $H^1$. It will be seen that the driven disc C receives its motion direct from the engine fly wheel shaft which drives the horizontal shaft L through the universal joint K. A driving disc E which comes into forced contact with the under surface of the driven disc C mounted at rear end of the shaft L, its only object being to rotate the driven disc C, the friction wheels F, F¹ on the underside giving all speeds according as they are moved on splined axle N to or from the centre of the driven horizontal disc C.

The horizontal friction wheel may be held above in a cross-piece as well as below and ball-bearings may be used both above and below.

By a powerful spring C¹ pressure of the driven disc is obtained on the driving disc or wheel E and by a simple movement of a lifting cam B which lifts the driven disc, the pressure contact is immediately removed. The driven disc provides all speeds forward as well as reverse. The horizontal disc C may be driven by the disc or wheel E on the end of the shaft L on its upper surface, or on its outside edge as may be desired.

By moving forward the lever A to second notch the cam B is revolved and forces up the spindle and disc C against the compression spring C¹ clear of the axle driving disc or wheels F, F¹. At the same time the compression spring D expands and lifts up the driving disc E, the engine then running free. On again putting the drive into action the driving disc E will have a lead over the axle driving discs, that is to say the horizontal disc C is in action with it before contact is made with the axle driving discs or wheels F, F¹. By moving the lever A to the first notch in the gate the horizontal disc C is kept running free of the axle driving wheels or discs F, F¹.

I may provide an alternative method of obtaining speeds for the horizontal driven disc, by having the driving shaft splined and carried across to rear of driven horizontal disc, and for reverse and forward speeds to draw along on splined driving shaft the driving disc, using suitable lever or fork, the axle being driven by friction wheel on under side of horizontal disc. The lifting arrangement may be similar to that previously described and illustrated.

Referring to Figure 7 which shows an alternative method where the horizontal disc C is driven by means of a pinion wheel Q engaging with teeth R cut round the edge of the large disc C. When the large disc is raised the teeth would slide in teeth of driving pinion and there would be no strain on the driving shaft.

As a further modification of my invention and referring to Figures 8, 9 and 10, I obtain slow speeds by an exactly opposite principle to the method I have just described. By this alternative arrangement the slow speeds are obtained outwardly from centre of driven disc to the outside of same thus obtaining the fullest possible leverage for hill climbing, all known friction driven vehicles having to drive on the innermost circle to obtain slow speeds, or to climb hills. According to the method already described, I use the horizontal driven disc but my speeds are obtained by mounting on the engine shaft or a continuation of it, a disc which slides on engine shaft from centre to outside or vice versa and the speed to the axle is by a pinion on end of horizontal speed disc spindle with bevel pinions on the rear axle, since the disc is horizontal it may be twice the size of the ordinary driven disc.

In these Figures 8, 9 and 10, A¹ is the shaft from the engine driving the splined shaft J through the universal joint K. The splined shaft J is supported by the bearings O, O. Mounted on the splined shaft J, and movable on it between the bearings O, O, is the driving disc P which drives the large horizontal driven disc S¹ by friction either on its lower or upper face. The disc S¹ is mounted on the vertical splined shaft T and is movable thereon, and fixed to the shaft T is the bevel-wheel U. Mounted on the rear axle V and fixed to it by a spline or splines are the bevel-wheels W and Y either of which can be made to mesh with the bevel-wheel U by sliding them on the axle V, one say Y being in mesh for forward driving and the other say Y for reverse.

My improvements are also applicable to motor boats and aircraft.

Claims:

1. In friction change-speed gear, the combination of a driving shaft; a rotatable driving friction disk; means whereby the disk is driven by the shaft at a point distant from its center; an axle; a driven friction disk splined on the axle and engaging the driving disk, and a reverse driven friction disk also splined on the axle.

2. In friction change-speed gear, the combination of a driving shaft; a rotatable driving friction disk; means whereby the disk is driven by the shaft at a point distant from its center; an axle; a driven friction disk splined on the axle and engaging the driving disk, and with a reverse driven friction disk also splined on the axle, the said driving friction disk having a groove in the face thereof in which the reverse friction disk may run when inoperative.

In testimony whereof I affix my signature in presence of two witnesses.

ROBERT BLAKOE.

Witnesses:
 OHN LIDDLE,
 JOHN FRANC LIDDLE.